April 7, 1970     D. J. MALK ET AL     3,505,197
APPARATUS FOR ELECTROCHEMICAL ANALYSIS
Filed Feb. 20, 1967     2 Sheets-Sheet 1

ROY W. ADAY JR.
ROBERT L. GREENE
DAVID J. MALK
GEORGE MATSUYAMA
ARNE J. PETERSEN
NICO JAN VAN SLOOTEN
INVENTORS

BY

ATTORNEY

April 7, 1970  D. J. MALK ET AL  3,505,197
APPARATUS FOR ELECTROCHEMICAL ANALYSIS
Filed Feb. 20, 1967  2 Sheets-Sheet 2

ROY W. ADAY JR.
ROBERT L. GREENE
DAVID J. MALK
GEORGE MATSUYAMA
ARNE J. PETERSEN
NICO JAN VAN SLOOTEN
*INVENTORS*

BY *Thomas L. Peterson*

ATTORNEY

United States Patent Office 3,505,197
Patented Apr. 7, 1970

3,505,197
APPARATUS FOR ELECTROCHEMICAL ANALYSIS
David J. Malk and Roy W. Aday, Jr., La Habra, Nico Jan Van Slooten, Chino, Robert L. Greene, Diamond Bar, Arne J. Petersen, Balboa, and George Matsuyama, Fullerton, Calif., assignors to Beckman Instruments, Inc., a corporation of California
Filed Feb. 20, 1967, Ser. No. 617,414
Int. Cl. G01n 27/26, 27/30, 27/56
U.S. Cl. 204—195  4 Claims

ABSTRACT OF THE DISCLOSURE

An apparatus for electrochemical analysis such as a pH meter in which the readout portion of the apparatus is mounted on top of an upright stand. The electrodes for the apparatus are positioned in a holder which is vertically adjustable on the stand so that the electrodes may be readily immersed and withdrawn from test solution below the readout portion of the apparatus.

---

This invention relates to an apparatus for electrochemical analysis and, more particularly, to such an apparatus and means associated therewith for supporting electrodes which are immersed in the test solution being analyzed.

In an apparatus for electrochemical analysis, such as a conventional pH meter for measuring the hydrogen ion concentration of a solution, it is customary to provide at either the right or left hand side of the meter a vertical post which carries a vertically adjustable electrode holder so that the electrodes associated with the pH meter may be readily immersed in a beaker of the test solution and withdrawn therefrom. Oftentimes the pH meter includes a horizontal shelf upon which the beaker is positioned underneath the electrodes connected to the meter. This arrangement has various disadvantages. Since the upright post supporting the electrode holder is mounted at either the left or right hand side of the pH meter, the meter is limited to left or right hand operation thus imposing some restriction to the convenient operation of the meter depending upon the versatility of the operator. In addition, the pH meter takes up substantial room on the bench upon which it is positioned while the cables connecting the electrodes to the meter are quite cumbersome and are a cause of substantial inconvenience. Also, oftentimes test solution in the beaker splashes upon the pH meter corroding the finish on the meter and causing short circuiting or other damage to the electrical circuitry within the meter unless elaborate sealing is provided for the controls on the meter. Finally, the conventional pH meter has the disadvantage that the readout panel on the meter is below the eye level of the operator thus not being in the most convenient location for easy observation.

It is, therefore, the principal object of the present invention to provide an improved apparatus for electrochemical analysis of solutions overcoming one or more of the disadvantages enumerated above.

Another object of the invention is to provide an improved means for mounting electrodes for vertical movement on an upright stand.

According to the principal aspect of the present invention, an apparatus for electrochemical analysis of solutions is provided in which the meter portion having a readout panel, controls, etc., such as a pH meter, is mounted on top of an upright stand which carries a vertically adjustable electrode holder. The electrode holder employs electrically conductive receptacles in which the electrodes are mounted. Flexible conductors are connected to the receptacles and pass through the rear portion of the electrode holder upwardly through the upright stand for connection to the circuit within the meter. Since the pH meter is mounted on top of the upright stand above the level of the bench upon which the stand is positioned, extra room is provided on the bench surface for beakers and other equipment of the operator. In addition, since the meter is positioned substantially above the level of the bench on top of an upright stand, there is no danger of splashing of corrosive solutions on the meter itself and the readout panel of the meter is at eye level for easy observation by the operator. Also, because the leads for the electrodes pass through the electrical holder and the upright stand of the apparatus, they do not interfere with the operator's movements and are shielded against AC interference. Finally, since the meter is mounted on top of the upright stand in the apparatus of the invention, the electrode holder may be mounted on front of the stand so as to be in optimum position for left and right hand manipulation by the operator.

According to another aspect of the present invention, there is provided an improved electrode holder which may be readily adjusted in any vertical position on an upright stand without the provision of screws, clamps or other holding devices as are generally employed in presently available electrode holders.

Other objects, aspects and advantages of the invention will become apparent from the following description taken in connection with the accompanying drawings wherein.

Figure 1:
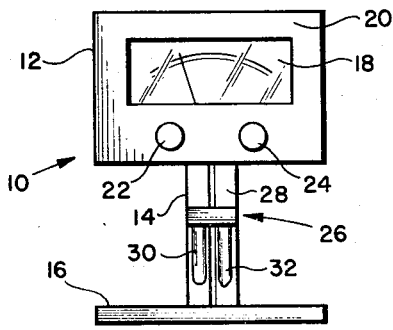
FIG. 1 is a front view of an apparatus for electrochemical analysis in accordance with the present invention wherein a pH meter is mounted on top of an upright stand.
Figure 2:
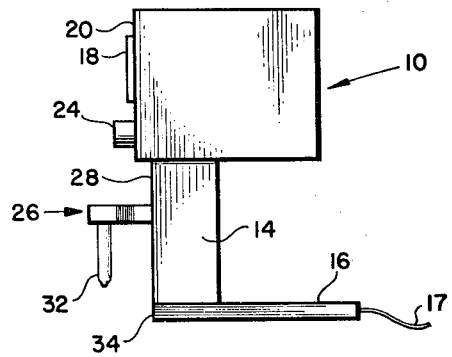
FIG. 2 is a side view of the apparatus of FIG. 1.

Referring now to the drawings in detail, wherein like reference characters designate like parts throughout the various views, there is shown in FIGS. 1 and 2 the apparatus of the invention, generally designated by numeral 10. The apparatus 10 comprises an instrument for electrochemical analysis such as a pH meter 12 mounted on top of an upright stand 14 which is supported on a base 16. A power cable 17 passes through the base 16 upwardly through the stand 14 for connection to the meter 12. The pH meter 12 has a readout panel 18 on its front face 20 together with suitable control knobs 22 and 24. While the instrument 12 is described herein as a pH meter, it is understood that it may take the form of any instrument for electrochemical analysis of solutions wherein electrodes are immersed in a sample solution and electrically connected to the instrument.

An electrode holder, generally designated by numeral 26, is mounted on the front face 28 of the stand 14 for vertical movement in a manner which will be described in detail later. A glass electrode or other indicating electrode 30 and reference electrode 32, as are customarily employed for measuring the ion concentration of solutions, are mounted in the forward portion of the electrode holder 26. A beaker containing test solution, not shown, may be positioned under the electrodes 30 and 32 so that upon vertical adjustment of the electrode holder 26 the electrodes may be immersed in the test solution and withdrawn therefrom after the analysis of the solution has been made.

As best seen in FIG. 2, it is preferable that the front edge 34 of the base 16 be flush with the front face 28 of the stand 14 so that the apparatus 10 may be positioned at the edge of a bench with the electrodes 30 and 32 overhanging the edge. This arrangement permits a large container of test solution to be moved underneath the electrodes 30 and 32 when the container is too large for positioning under the electrodes when positioned on the bench.

Since the electrode holder 26 and the readout panel 18 face in the same direction, the electrodes 30 and 32 may be readily handled by the operator with either his left or right hand while the readout panel remains directing in front of the operator for visual observation. Also, since the meter 12 is positioned on top of the stand 14 and therefore above any beakers containing solution which might be corrosive, the problem of splashing of the solution on the meter 12 is overcome. In addition, by removing the meter 12 from the bench surface, the surface of the base 16 may be employed for positioning additional beakers or other equipment utilized by the operator.

Figure 3:
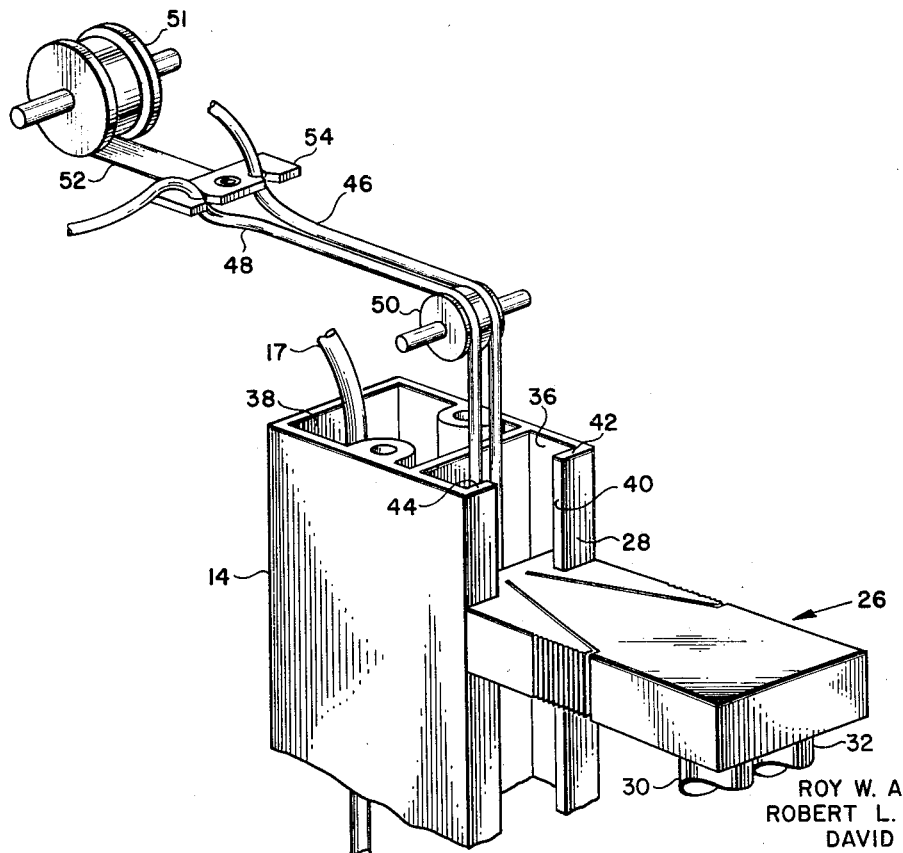
FIG. 3 is a perspective view of the upper portion of the stand illustrated in FIGS. 1 and 2 with the meter removed with means being shown schematically for taking out the slack in the leads connected to the electrodes employed in the apparatus.
Figure 4:
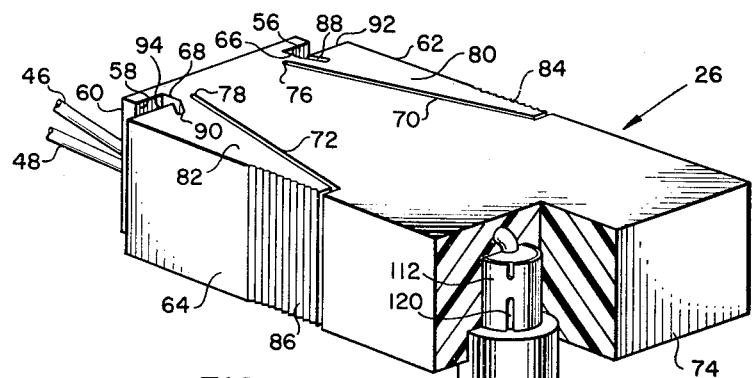
FIG. 4 is a perspective view of the electrode holder of the invention employed in the apparatus illustrated in FIGS. 1–3 with a portion thereof broken away showing the manner in which one electrode is mounted within the holder, with the top of a second electrode being shown disassembled from the holder.
Figure 5:
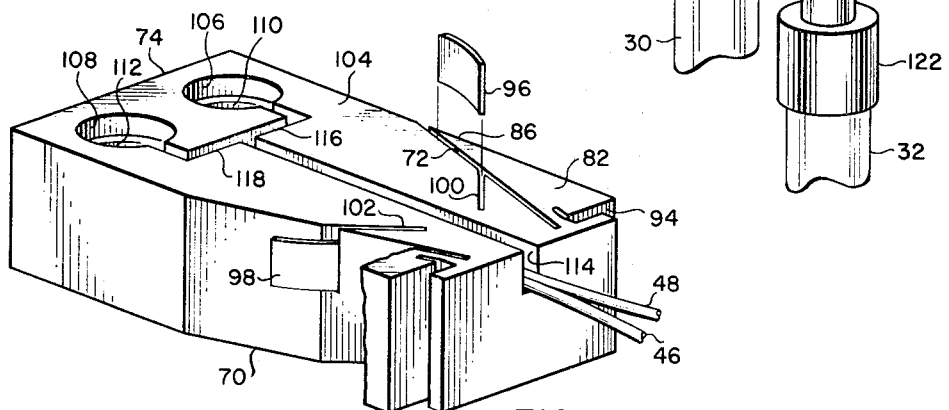
FIG. 5 is a perspective view of the electrode holder in FIG. 4 showing the bottom side thereof, with a portion of the holder broken away to show the mounting of a leaf spring therein.

Reference is now made to FIGS. 3–5 which illustrate in detail the electrode holder of the invention and the construction of the upright stand 14 permitting rapid vertical adjustment of the holder. As best seen in FIG. 3, the stand 14 has forward and rear vertical channels 36 and 38, respectively, with the power cable 17 passing through the channel 38. A vertical slot 40 is cut in the front face 28 of the stand 14 intermediate the sides of the stand so as to provide a pair of vertical flanges 42 and 44.

Leads 46 and 48, which are in the form of flexible insulated conductors, are in electrical contact with the electrodes 30 and 32 in a manner which will be seen later and pass through the rear portion of the electrode holder 26 upwardly through the channel 36 in the stand 14 and over a pulley 50 mounted in the pH meter 12. A negator spring 51 in the housing of the meter 12 has a flexible strap 52 terminating in a notched plate 54 which is secured to the upper ends of the leads 46 and 48. The negator spring 51 is arranged so as to exert an upward pulling force upon the leads 46 and 48 so that when the electrode holder 26 is moved upwardly on the stand 14 the negator spring 51 will take up the slack in the leads 46 and 48. Consequently, the leads will not become entangled in the channel 36 of the stand 14. When the electrode holder 26 is moved downwardly on the stand 14 the strap 52 unwinds from the negator spring 51 permitting the leads 46 and 48 to be pulled downwardly through the channel 36. If desired, a reel, not shown, may be positioned in the pH meter housing adjacent to the negator spring 51 upon which the leads 46 and 48 may be wound when the electrode holder 26 is moved upwardly in the stand 14.

The electrode holder 26 is formed of a plastic material, preferably polypropylene, and is shaped to cooperate with the flanges 40 and 42 on the stand 14 so that the electrode holder may be readily moved vertically on the stand yet will normally remain frictionally engaged with the flanges 40 and 42. The configuration of the rear portion of the electrode holder 26 which cooperates with the flanges 40 and 42 can best be seen in FIG. 4 wherein there is shown a pair of vertical aligned slots 56 and 58 adjacent to the rear end 60 of the electrode holder. The slots open at the side walls 62 and 64, respectively, of the holder. The width of the slots 56 and 58 is essentially the same as that of the flanges 40 and 42 while the space between the inner ends 66 and 68 of the slots 56 and 58, respectively, is slightly less than the width of the slot 40 in the upright stand 14. Thus, as seen in FIG. 3, when the electrode holder is positioned on the stand 14 with the flanges 40 and 42 engaged within the slots 56 and 58 of the electrode holder, the frictional engagement between the electrode holder 26 and the flanges is such that the stand frictionally supports the electrode holder.

The electrode holder 26 is provided with means for relieving the frictional engagement between the electrode holder and the flanges 40 and 42 on the stand 14 so that the vertical position of the electrode holder may be readily varied. This means includes a pair of vertical slots 70 and 72 opening at the side walls 62 and 64, respectively, of the electrode holder intermediate the front end 74 and rear end 60 of the holder. The slots 70 and 72 extend at an acute angle with respect to the longitudinal axis passing through the ends of the electrode holder with the inner ends 76 and 78 of the slots terminating adjacent the rear portion of the holder and sufficiently close to the inner ends 66 and 68 of the slots 56 and 58 so that the portions of the electrode holder between the two pairs of slots are sufficiently small to permit the triangular sections 80 and 82 bounded by the slots 56, 70 and 58, 72 to pivot when pressure is applied to the forward parts 84 and 86 of such triangular sections. Forwardly extending vertical slots 88 and 90 in the electrode holder adjacent to the inner ends 66 and 68 of the slots 56 and 58, respectively, provide additional flexibility for movement of the triangular sections 80 and 82 of the holder. The forward portions 84 and 86 of such sections are formed with vertical grooves, as best seen in FIG. 4, which may be firmly engaged by the operator when it is desired to alter the position of the electrode holder in the stand 14. When the operator forces the forward portions 84 and 86 of the triangular sections 80 and 82 inwardly with his fingers causing such sections to pivot about their rear ends, the forward walls 92 and 94 of the sections will move away from the front face of the flanges 42 and 44 on the stand 14 thereby releasing the frictional engagement between the stand and the electrode holder. When the operator removes his fingers from the electrode holder so as to release the pressure applied to the triangular sections 80 and 82 of the holder, the resiliency of the plastic material of the holder will cause these sections to return to their original position wherein the forward walls 92 and 94 will again become frictionally engaged with the flanges 42 and 44 on the stand 14.

Preferably, spring means are provided for urging the forward portions 84 and 86 of the triangular sections 80 and 82 of the holder outwardly to ensure firm frictional contact of the holder with the flanges 42 and 44 of the stand. Such spring means is seen in FIG. 5 and comprises a pair of leaf springs 96 and 98 which are mounted with one end located in slots 100 and 102, respectively, formed in the lower side 104 of the electrode holder and with their other ends extending into the slots 72 and 70 in the holder. In FIG. 5, the spring 96 is shown prior to its mounting in the slots 72 and 100. The leaf springs are normally flat but are slightly bent as shown in the drawing to permit their being inserted into the slots 70 and 100. When the springs are mounted in the slots, the tendency of the springs to return to their original flat configuration causes the forward part 84 and 86 of the triangular sections 80 and 82 of the holder to move outwardly thereby forcing the forward walls 92 and 94 into firm frictional engagement with the flanges 42 and 44 when the holder is mounted on the stand 14. The configuration of the slots 100 and 102 can best be appreciated by reference to the slot 102 carrying the spring 98 in FIG. 5 wherein the major portion of the triangular section 80 of the holder is broken away to show that the slot 102 extends only partially through the electrode holder yet is sufficiently deep so that the spring 98 is below the surface 104 of the holder.

The electrodes 30 and 32 are mounted in the forward portion of the electrode holder 26 in a manner which can be best understood by making reference to FIGS. 4 and 5. As seen in FIG. 5, there is provided in the forward portion of the electrode holder two vertical passages 106 and 108 in which there are embedded electrically conductive receptacles 110 and 112, respectively. The configuration of the receptacle 112 is best seen in FIG. 4. The leads 46 and 48 pass through a longitudinally extending slot 114 formed in the bottom surface 104 of the electrode holder. Laterally extending slots 116 and 118 connect the slot 114 to the passages 110 and 108 so that the leads 46 and 48 may be directed to the receptacles. The conductors in the leads 46 and 48 are electrically connected to the receptacles by solder or the like. Both the electrodes 30 and 32 have an electrically conductive section 120 extending from the top of the cap 122 which is frictionally engaged in the receptacles 110 and 112, the electrode 32 in FIG. 4 being shown disassembled from the holder with the electrode 30 being shown mounted in the receptacle 112. It can be appreciated, therefore, that the electrodes 30 and 32 may be readily mounted and removed from the electrode holder due to the mere frictional connection between the two parts. This permits the rapid replacement of electrodes in the holders without the requirement of disconnecting leads which is the practice in presently available pH meters.

While the electrode holder 26 and upright stand 14 have been shown specifically in connection with the pH meter arrangement disclosed in FIGS. 1 and 2 of the drawings, it is understood that the pH meter 12 could be removed from the stand 14 and the stand and electrode holder 26 used separately. In such case, the pulley 50 and the negator spring 51 could be eliminated or mounted in either the upper or lower end of the rear channel 38 of the stand 14.

Figure 6:
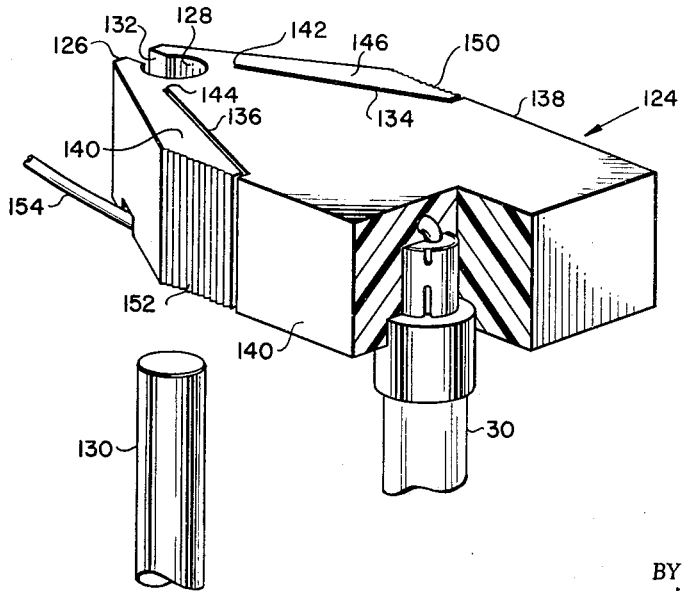
FIG. 6 is a perspective view of another form of the electrode holder of the invention.

A slightly different form of the electrode holder of the invention, generally designated by numeral 124, is shown in FIG. 6. An electrode 30 is shown mounted in the forward portion of the holder 124 in exactly the same fashion as described above in connection with FIG. 4. Adjacent the rear end 126 of the holder 124 there is provided a vertical passage 128 of a diameter substantially the same as that of the vertical post 130 so that the post 130 may be received in the passage 128 of the holder. A vertical slot 132 extends from the passage 128 to the rear end 126 of the holder. A pair of verical slots 134 and 136 have their forward portions opening at the sides 138 and 140, respectively, of the holder and extend at an angle rearwardly to a point where their inner ends 142 and 144 are closely adjacent to the wall of the vertical passage 128. The inner ends 142 and 144 of the slots 134 and 136 are sufficiently close to the walls of the passage 128 so as to permit the sections 146 and 148 of the holder outside of the slots 134 and 136 to pivot when pressure is exerted against the forward parts 150 and 152 of said sections in a fashion similar to that in the electrode holder 26. However, in the electrode holder 124, when pressure is exerted inwardly on the forward parts 150 and 152 of the sections 146 and 148, the bifurcated end 126 of the holder spreads thereby releasing frictional engagement of the wall of the passage 128 with the upright post 130. When pressure is released from the sections 146 and 148, the resiliency of the material of the holder 124 causes the bifurcated end 126 of the holder to tightly engage the post 130 so that the post will by itself support the electrode holder and electrodes mounted therein. The leads for the electrode mounted in the holder pass through the rear portion of the holder in any convenient manner, only one of such leads 154 being shown in FIG. 6. Also, springs similar to springs 96 and 98 of the holder shown in FIG. 5 may be provided in the electrode holder 124 for ensuring frictional engagement of the wall of the passage 128 with the post 130.

It should be appreciated that the electrode holder arrangement of FIG. 6 may be utilized by itself or could be employed in connection with the stand 14 of FIG. 3 by mounting the post 130 within the vertical channel 36 of the stand.

Although several embodiments of the invention have been disclosed herein for purposes of illustration, it will be understood that various changes can be made in the form, details, arrangement, proportions of the various parts in such embodiments without departing from the spirit and scope of the invention as defined by the appended claims.

What is claimed is:

1. In an apparatus for electrochemical analysis of a solution wherein at least one electrode is immersed in the solution, the combination of:
   a base;
   an upright stand on said base having a front face;
   a meter supported by said stand having a readout panel facing in the same direction as said front face of said stand;
   an electrode holder having at least one electrically conductive receptacle for receiving an electrode;
   means mounting said electrode holder for vertical movement at said front face of said stand;
   a flexible conductor having one end connected to said receptacle and its other end passing upwardly through said stand and into said meter for connection to the circuit therein; and
   the front edge of said base being flushed with said front face of said stand.

2. The apparatus as set forth in claim 1 including means connected to said flexible conductor for taking up the slack in said conductor as said electrode holder is moved upwardly on said stand.

3. In an apparatus for electrochemical analysis of a solution wherein at least one electrode is immersed in the solution, the combination of:
   a base;
   an upright stand on said base having a front face;
   a meter supported by said stand having a readout panel facing in the same direction as said front face of said stand;
   an electrode holder having at least one electrically conductive receptacle for receiving an electrode;
   means mounting said electrode holder for vertical movement at said front face of said stand;
   a flexible conductor having one end connected to said receptacle and its other end passing upwardly through said stand and into said meter for connection to the circuit therein;
   a vertical channel in said upright stand;
   a vertical slot in said front face of said stand intermediate the edges of said face and extending inwardly to said channel so as to provide a pair of spaced vertical flanges;
   said electrode holder having a pair of aligned vertical slots opening at the sides thereof, said slots having substantially the same width as that of said flanges and the portion of said electrode holder between the inner ends of said slots having a width less than that of said vertical slot in said front face;
   said electrode holder being mounted on said stand with said vertical flanges being frictionally engaged in said pair of slots whereby said flanges frictionally support said electrode holder; and
   means on said electrode holder for readily releasing the frictional engagement between the holder and said flanges, said last mentioned means comprising a second pair of vertical slots in said electrode holder opening at said sides thereof forwardly of said first mentioned pair of vertical slots and extending inwardly to a point sufficiently close to the inner ends of said first mentioned pair of vertical slots so that the sections of said electrode holder between said two pairs of slots will pivot at the point between said inner ends of said slots upon applying pressure to the forward part of said sections adjacent to the point where said second pair of slots opens at said sides of said holder.

4. An apparatus as set forth in claim 3 including spring means in said holder biasing said forward part of said sections outwardly from the sides of said holder, thereby pivoting said sections into firm frictional engagement with said vertical flanges.

References Cited
UNITED STATES PATENTS

| | | | |
|---|---|---|---|
| 2,566,676 | 9/1951 | Rabbitts | 204—195 |
| 2,666,691 | 1/1954 | Robinson et al. | 23—253 |
| 2,727,711 | 12/1955 | Bally | 248—246 |
| 2,776,257 | 1/1957 | Affleck | 204—195 |
| 3,366,565 | 1/1968 | Bokshitsky et al. | 204—195 |

JOHN H. MACK, Primary Examiner

T. TUNG, Assistant Examiner

U.S. Cl. X.R.

204—286, 297; 108—107; 324—30; 248—245